(12) United States Patent
Igarashi et al.

(10) Patent No.: US 8,928,267 B2
(45) Date of Patent: Jan. 6, 2015

(54) MOTOR CONTROLLER

(75) Inventors: Yuji Igarashi, Tokyo (JP); Hidetoshi Ikeda, Tokyo (JP); Kiyoshi Maekawa, Tokyo (JP); Kei Terada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 13/643,243

(22) PCT Filed: Feb. 7, 2011

(86) PCT No.: PCT/JP2011/052559
§ 371 (c)(1),
(2), (4) Date: Oct. 24, 2012

(87) PCT Pub. No.: WO2011/145366
PCT Pub. Date: Nov. 24, 2011

(65) Prior Publication Data
US 2013/0038265 A1 Feb. 14, 2013

(30) Foreign Application Priority Data

May 17, 2010 (JP) ................................. 2010-113307

(51) Int. Cl.
*H02P 7/18* (2006.01)
*G05B 19/416* (2006.01)
*H02P 6/08* (2006.01)

(52) U.S. Cl.
CPC .... *G05B 19/416* (2013.01); *G05B 2219/43149* (2013.01); *G05B 2219/43203* (2013.01); *H02P 6/08* (2013.01)
USPC ............ 318/469; 318/560; 318/571; 318/632

(58) Field of Classification Search
CPC ........................................................ H02P 6/08
USPC ................... 318/469, 560, 571, 632
See application file for complete search history.

(56) References Cited

U.S. PATENT DOCUMENTS 5,371,450 A 12/1994 Hiraoka
7,049,775 B2 * 5/2006 Iwashita et al. ............... 318/566

FOREIGN PATENT DOCUMENTS

| CN | 101259746 A | 9/2008 |
| JP | 6 55599 | 3/1994 |
| JP | 7 31173 | 1/1995 |
| JP | 10 84686 | 3/1998 |
| JP | 2000 141262 | 5/2000 |
| JP | 2006 147640 | 6/2006 |
| JP | 2009 141987 | 6/2009 |

OTHER PUBLICATIONS

U.S. Appl. No. 13/884,295, filed May 9, 2013, Igarashi, et al.
International Search Report Issued Apr. 26, 2011 in PCT/JP11/52559 Filed Feb. 7, 2011.
Office Action mailed Aug. 5, 2014 in Chinese Application No. 201180024134.1 (w/English translation).

* cited by examiner

*Primary Examiner* — David Luo
(74) *Attorney, Agent, or Firm* — Oblon, Spivak, McClelland, Maier & Neustadt, L.L.P.

(57) ABSTRACT

To stably control a driving object to approach and contact a pressure object at a low impact, to suppress a vibration generated when the driving object presses the pressure object, and to enable a motor controller to operate based on a simple command, a regression torque controller of the motor controller limits a torque-control velocity command to up to a velocity limit value vlim defined based on a contact velocity between a driving object and a pressure object and outputs the torque-control velocity command, and a velocity controller of the motor controller calculates a torque command so that a motor velocity can follow the torque-control velocity command output from the regression torque controller.

7 Claims, 8 Drawing Sheets

MOTOR CONTROLLER

FIELD

The present invention relates to a motor controller that drives a motor included in an industrial machine.

BACKGROUND

As a type of an industrial machine, there is known a cap fastener, an electrical screw driver, or a molding machine that moves a driving object to a predetermined position and then presses the driving object against a pressure object at a desired pressure. For an industrial machine of this type, a motor control method of executing a position control to cause the rotational position of a motor to follow a position command when the driving object moves, and for switching the position control to a feed-forward torque control to cause the motor to directly generate a set reference torque is frequently adopted.

Such a motor control method of switching between the position control and the feed-forward torque control has the following problems. When the control method is simply switched from one to the other, the discontinuous change in a torque during the switching generates an impact and a vibration or causes the excessive increase in a motor velocity.

To solve these problems, for example, Patent Literature 1 discloses a technique of switching between a position/velocity control using a position or a velocity command and the feed-forward torque control using reference torque based on a switching signal input from outside. According to this technique, when the motor velocity exceeds a velocity limit value in the torque control after the switching, the velocity control based on the velocity limit value is executed to prevent the motor velocity from increasing. Furthermore, when the motor velocity returns to fall within the velocity limit, the feed-forward torque control is executed again. Further, an appropriate setting of the value of an integrator included in a velocity controller during the switching can ensure torque continuity.

Patent Literature 2 discloses a technique of realizing a desired operation by feeding back an applied-pressure estimated value instead of using an applied pressure sensor in a robot controller such as a spot welding robot controller. Specifically, according to this technique, a control device includes a disturbance estimation observer that estimates a disturbance torque against a motor from a torque (a current) and a motor velocity, and a velocity controller (a velocity-loop processing unit). In a torque control mode (an applied-pressure control mode), the controller feeds back a deviation between a reference torque (an applied pressure command-converted torque) and an estimated disturbance torque. The estimated disturbance torque is output from the disturbance estimation observer to a velocity command. Furthermore, the robot controller presses a driving object against a pressure object in a state of a position control mode of executing an ordinary position control, determines a timing at which the estimated disturbance torque exceeds a predetermined value, and switches the position control mode to the torque control mode described above.

CITATION LIST

Patent Literatures

Patent Literature 1: Japanese Patent Application Laid-open No. 2009-141987

Patent Literature 2: Japanese Patent Application Laid-open No. 2000-141262

SUMMARY

Technical Problem

However, the technique disclosed in Patent Literature 1 mentioned above has the following problems. In a case where the position/velocity control is switched to the torque control at a timing at which the driving object does not contact the pressure object, when the motor velocity is closer to the velocity limit value, the velocity control is frequently switched between ON and OFF, resulting in an unstable behavior. Furthermore, when the driving object presses the pressure object, a reaction force from the pressure object becomes disturbance and sometimes vibrates the motor. However, with the technique of Patent Literature 1, it is impossible to suppress the generated vibration because the torque is simply feed-forward controlled.

Further, according to the technique of Patent Literature 2, a command generator for the control device needs to generate a position command based on a detailed calculation so as to cause the driving object to contact the pressure object without excessively applying an impact onto the pressure object by operating in the position control mode, and so as to generate the applied pressure equal to or higher than the predetermined value after the contact. Furthermore, it is necessary to determine whether to perform the switching using the estimated disturbance torque that is a special variable for an ordinary positioning control or the like during the switching between the position control mode and the torque control mode. To apply such a function to the simple command generator used for simple positioning or the like is unrealistic from the viewpoint of the development cost or the like.

The present invention has been achieved in view of the above problems, and an object of the present invention is to provide a motor controller that can stably control a driving object to approach and contact a pressure object at a low impact, and that can suppress a vibration generated when the driving object presses the pressure object. It is also an object of the present invention to provide a motor controller that operates based on a simple command.

Solution to Problem

A motor controller according to an aspect of the present invention controls a motor that drives a driving object to press the driving object against a pressure object at a pressure corresponding to a reference torque, the motor controller including: a velocity controller that calculates a torque command to the motor and a regression torque for compensating for the torque command based on a detected velocity value of the motor; and a regression torque controller that calculates a first velocity command corresponding to a deviation between the reference torque and the regression torque calculated by the velocity controller, wherein the regression torque controller limits the calculated first velocity command up to a predetermined velocity limit value that is calculated based on a contact velocity between the driving object and the pressure object, and outputs the first velocity command, and the velocity controller calculates the torque command so that the detected velocity value follows the first velocity command output from the regression torque controller.

Advantageous Effects of Invention

According to the present invention, the motor controller can automatically execute the velocity control under which a velocity limit value is a velocity command instead of causing a motor to generate a reference torque until a driving object contacts a pressure object, so that the motor controller can stably control the driving object to approach the pressure object and to contact the pressure object at a low impact. Furthermore, after the driving object contacts the pressure object, the motor controller controls the motor to generate the reference torque while feeding back the detected velocity value. Therefore, it is possible to suppress a vibration generated when pressing the pressure object. Further, the motor controller controls the driving object to move to a position at which the driving object contacts the pressure object and to contact and then press the pressure object only by inputting the reference torque to the motor controller from the command generator. Therefore, the motor controller can perform an operation based on a simple command.

DESCRIPTION OF EMBODIMENTS

Exemplary embodiments of a motor controller according to the present invention will be explained below in detail with reference to the accompanying drawings. The present invention is not limited to the embodiments.

First Embodiment

Figure 1:
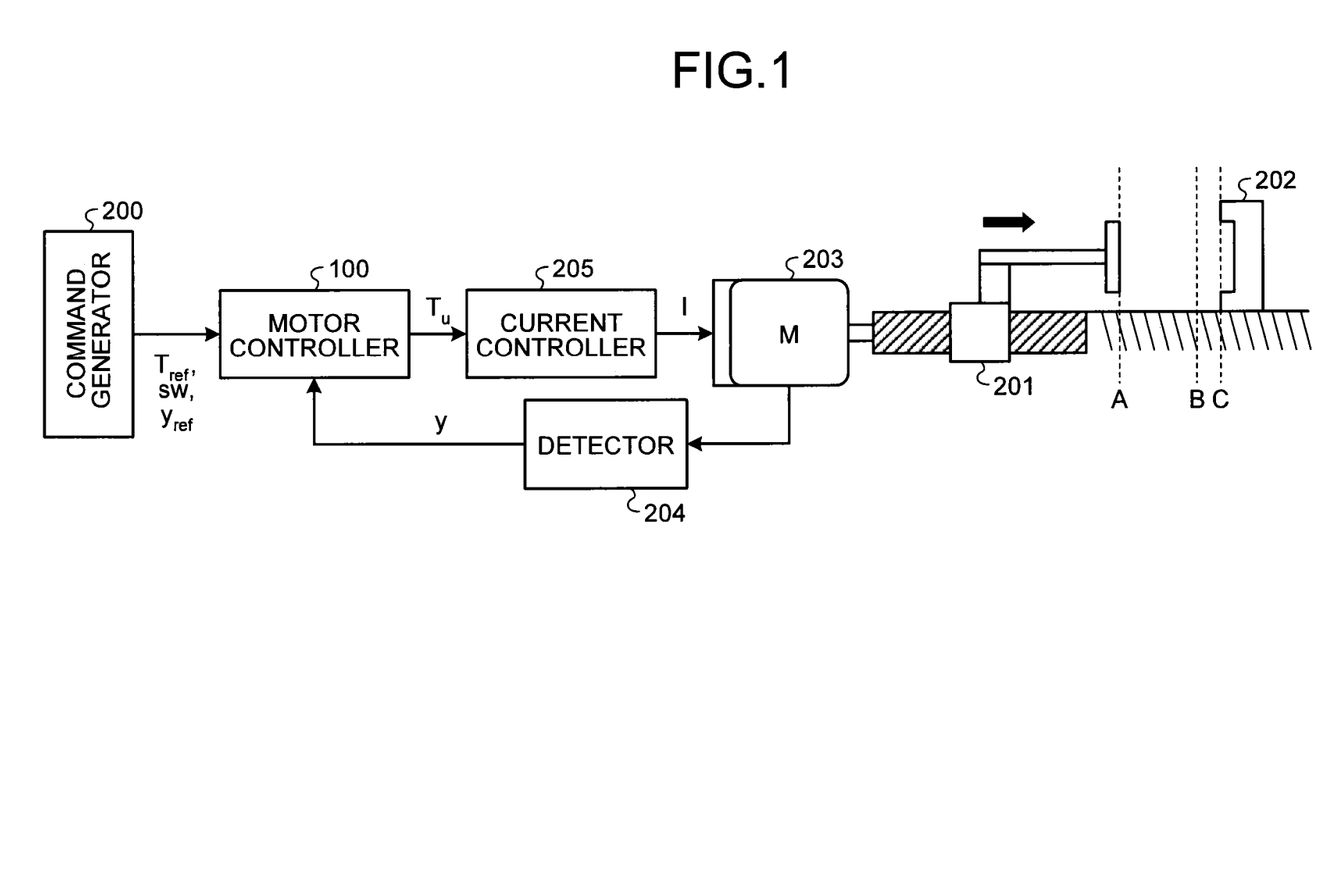
FIG. 1 is an explanatory diagram of an example of connection of a motor controller according to a first embodiment.

In embodiments of the present invention, a motor controller controls a motor to drive a driving object and to press the driving object against a pressure object at a desired pressure. As an example, a case where the motor controller is applied to a molding system that presses and molds a molding target between the driving object and the pressure object is described. FIG. 1 is an explanatory diagram of an example of connection of the motor controller according to a first embodiment of the present invention.

As shown in FIG. 1, the molding system includes a driving object 201, and a pressure object 202 that is provided in a driving direction of the driving object 201. The molding object is arranged to contact the pressure object 202, and deformed and molded by the driving object 201 pressed against the pressure object 202. The driving object 201 is pressed against the pressure object 202 when a motor 203 drives a structure such as a ball screw.

A current controller 205 generates an actual current I to be supplied to the motor 203 based on a torque command $T_u$. The motor 203 operates at a torque based on the torque command $T_u$ when the actual current I flows to the motor 203, and drives the driving object 201. Furthermore, a detector 204 that detects a rotation position of the motor 203 is attached to the motor 203, and the detector 204 outputs a detected motor operation value (position detection value) y that represents a rotation angle or the like of the motor 203.

A reference command (a position command) $y_{ref}$, a reference torque $T_{ref}$ and a switching signal sw are input to a motor controller 100 from a command generator 200. The motor controller 100 switches operation modes between a position control mode and a torque control mode based on the switching signal sw. In the position control mode, the torque command $T_u$ is generated so that the detected motor operation value y can follow the reference command $y_{ref}$. In the torque control mode, the torque command $T_u$ is generated so as to press the driving object 201 against the pressure object 202 at the reference torque $T_{ref}$. It is described that the command generator 200 instructs the motor controller 100 to execute a position control when the driving object 201 is driven to move from a position A, which is assumed as an initial position, to a position B in front of a position C at which the driving object 201 contacts the pressure object 202 (to be precise, a molding target), and instructs the motor controller 100 to execute a torque control at and after the position B. In the following explanations, it is assumed that the concept of the pressure object 202 includes the molding target.

Figure 2:
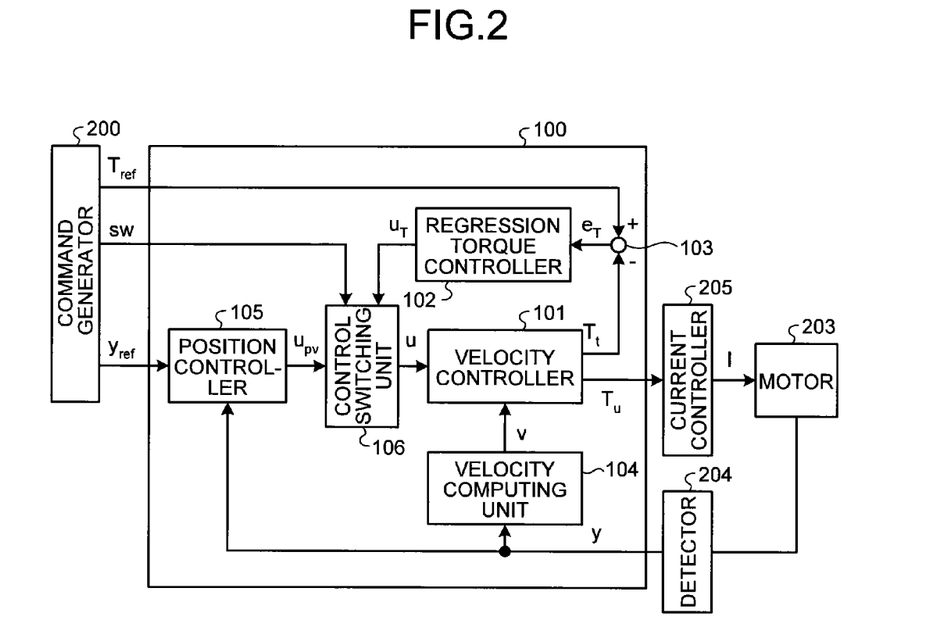
FIG. 2 is an explanatory diagram of a configuration of the motor controller.

FIG. 2 is an explanatory diagram of a configuration of the motor controller 100. As shown in FIG. 2, the motor controller 100 includes a velocity controller 101, a regression torque controller 102, a torque signal subtracter 103, a velocity computing unit 104, a position controller 105, and a control switching unit 106.

The reference command $y_{ref}$ input from the command generator 200 and the motor operation value y detected by the detector 204 are input to the position controller 105. The position controller 105 computes a position-control velocity command (second velocity command) $u_{pv}$ so that the detected motor operation value y can follow the reference command $y_{ref}$. For example, when the position controller 105 executes a P-control, the position controller 105 executes a computation as expressed by an Equation (1), where $K_p$ indicates a position gain, and outputs a result of the computation as the position-control velocity command $u_{pv}$.

$$u_{pv}=K_p(y_{ref}-y) \quad (1)$$

The position controller 105 outputs the obtained position-control velocity command $u_{pv}$ to the control switching unit 106.

The velocity computing unit 104 performs a difference process, a filtering process, or the like on the motor operation value y detected by the detector 204, thereby calculating a motor velocity v. The velocity computing unit 104 outputs the calculated motor velocity v to the velocity controller 101.

The velocity controller 101 calculates the torque command $T_u$ so that the motor velocity v input from the velocity computing unit 104 can equal to a velocity command u input from the control switching unit 106 (described later). The velocity controller 101 outputs the calculated torque command $T_u$ to the current controller 205. Furthermore, the velocity controller 101 calculates a regression torque signal $T_t$, a steady-state value of which equals to the torque command $T_u$, and outputs the calculated regression torque signal $T_t$ to the torque signal subtracter 103.

For example, the velocity controller 101 executes a computation by a combination of a PI control and a filter as expressed by an Equation (2), and calculates the torque command T.

$$T_u = H(s) \cdot K_v \cdot \{(s+K_i)/s\} \cdot (u-v) \quad (2)$$

In the Equation (2), s indicates a Laplace operator, $K_v$ indicates a P gain, and $K_i$ indicates a velocity I gain. A filter H(s) removes predetermined frequency components in a higher frequency than a control band that is determined by a control gain of the velocity controller 101. The filter H(s) enables the detected motor operation value y to promptly follow the reference command $y_{ref}$ by improving stability of a velocity feedback loop that feeds back the motor velocity v by the use of an element called "lowpass filter" or "notch filter" and by setting gains of the velocity controller 101 and the position controller 105 to be high. Therefore, the filter H(s) is essential to an improvement in the response of a control system in an ordinary velocity control, and provides complicated characteristics to the control system depending on situations.

For example, the velocity controller 101 executes a computation based on the PI control as expressed by an Equation (3), and calculates the regression torque signal $T_t$.

$$T_t = K_v \cdot \{(s+K_i)/s\} \cdot (u-v) \quad (3)$$

According to the Equations (2) and (3), a relation expressed by the following Equation (4) is held between the torque command $T_u$ and the regression torque signal $T_t$.

$$T_u = H(s) \cdot T_t \quad (4)$$

The filter H(s) is intended to remove the predetermined frequency components as described above, and a steady-state gain |H(0)| is set to 0 dB so as to make the steady-state values of the torque command $T_u$ and the regression torque signal $T_t$ equal to. It suffices that the velocity controller 101 calculates the regression torque signal $T_t$ using the Equation (3), and calculates the torque command $T_u$ using the Equation (4) by assigning the regression torque signal $T_t$ to the Equation (4).

The torque signal subtracter 103 calculates a difference between the regression torque signal $T_t$ calculated by the velocity controller 101 and the reference torque $T_{ref}$ (see the following Equation (5)). The torque signal subtracter 103 outputs the obtained difference to the regression torque controller 102 as a torque signal deviation $e_T$.

$$e_T = T_{ref} - T_t \quad (5)$$

Figure 3:
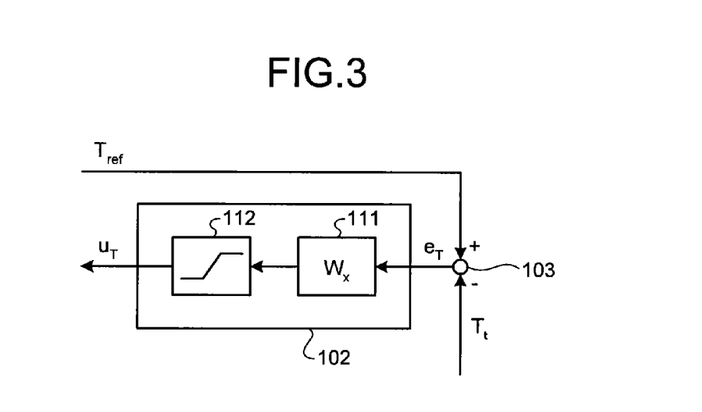
FIG. 3 is an explanatory diagram of a configuration of a regression torque controller according to the first embodiment.

The regression torque controller 102 calculates a torque-control velocity command (first velocity command) $u_T$ to be supplied to the control switching unit 106 based on the torque signal deviation $e_T$. FIG. 3 is an explanatory diagram of a configuration of the regression torque controller 102.

As shown in FIG. 3, the regression torque controller 102 includes a torque signal gain 111 and a torque signal limiter 112. The torque signal gain 111 multiplies the torque signal deviation $e_T$ by a constant ($W_x$) and outputs a result of multiplication to the torque signal limiter 112. The torque signal limiter 112 limits a magnitude (an absolute value) of the output from the torque signal gain 111 to be equal to or smaller than a predetermined magnitude (a velocity limit value) and outputs a result of the limitation as the torque-control velocity command $u_T$.

That is, when the velocity limit value is expressed as vlim, the torque-control velocity command $u_T$ output from the torque signal limiter 112 is calculated according to an Equations (6).

$$u_T = W_x \cdot e_T \text{ if } |W_x \cdot e_T| < \text{vlim}$$

$$u_T = \text{vlim if } |W_x \cdot e_T| \geq \text{vlim} \quad (6)$$

As the velocity limit value vlim, a velocity at which no inadvertent damage occurs to the driving object 201 and the pressure object 202 when the driving object 201 contacts the pressure object 202. It is assumed here that the velocity limit value vlim is smaller than $|W_x \cdot T_{ref}|$.

The position-control velocity command $u_{pv}$ output from the position controller 105, the torque-control velocity command $u_T$ output from the regression torque controller 102, and the switching signal sw are input to the control switching unit 106. The control switching unit 106 outputs the position-control velocity command $u_{pv}$ to the velocity controller 101 as the velocity command u when the command generator 200 selects the position control mode by the switching signal sw, and outputs the torque-control velocity command $u_T$ to the velocity controller 101 as the velocity command u when the command generator 200 selects the torque control mode.

Figure 4:
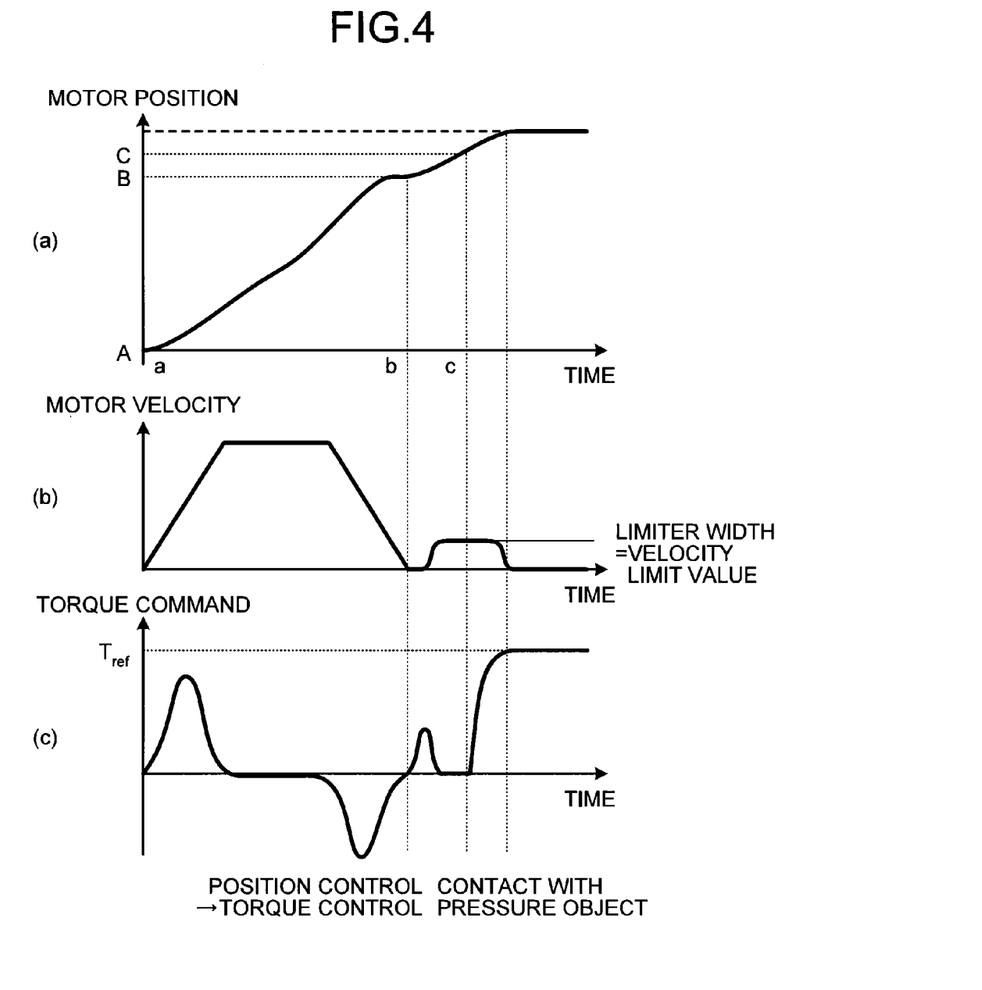
FIG. 4 depicts graphs for explaining an operation performed by the motor controller according to the first embodiment.

An operation performed by the motor controller 100 is explained next. FIG. 4 depicts graphs for explaining an operation performed by the motor controller 100. FIG. 4(a) depicts a transition of a motor rotation position, that is, the detected motor operation value y. A, B, and C depicted on a vertical axis correspond to the position A (a point A), the position B (a point B), and the position C (a point C) shown in FIG. 2, respectively. Specifically, the position A represents the initial position of the driving object 201, the position B represents the point at which the command generator 200 switches the switching signal sw from the position control mode to the torque control mode, and the position C represents the point at which the driving object 201 contacts the pressure object 202. Furthermore, a, b, and c depicted on a horizontal axis represent a time at which the driving object 201 reaches the point A, the point B, and the point C, respectively. FIG. 4(b) is a graph of a transition of the motor velocity v, and FIG. 4(c) is a graph of a transition of the torque command $T_u$.

An operation performed by the motor controller 100 is explained while separately referring to a case where the command generator 200 selects the position control mode as the switching signal sw, a case where the command generator 200 switches the position control mode to the torque control mode, and a case where the command generator 200 selects the torque control mode as the switching signal sw.

When the motor controller 100 operates in the position control mode, that is, while the command generator 200 selects the position control mode as the switching signal sw, the control switching unit 106 outputs the position-control velocity command $u_{pv}$ as the velocity command u. That is, while the command generator 200 selects the position control mode as the switching signal sw, the following Equation (7) is established.

$$u = u_{pv} \quad (7)$$

Therefore, the motor controller 100 executes the position control for a period from a time a to a time b (until the detected motor operation value y reaches the point B from the point A), and the driving object 201 stops at the point B.

When the command generator 200 switches the switching signal sw from the position control mode to the torque control mode, the control switching unit 106 switches the velocity command u from the position-control velocity command $u_{pv}$ to the torque-control velocity command $u_T$.

When the command generator 200 switches the position control mode to the torque control mode, the driving object 201 substantially stops at the point B, so that the torque command $T_u$ is equal to the regression torque signal $T_t$. Therefore, the torque signal deviation $e_T$ calculated by the torque signal subtracter 103 is equal to the reference torque $T_{ref}$ and the reference torque $T_{ref}$ is input to the regression torque controller 102. Furthermore, the torque signal gain 111 outputs the $W_x \cdot T_{ref}$.

When the regression torque controller 102 does not include the torque signal limiter 112 and outputs the $W_x \cdot T_{ref}$ as the torque-control velocity command $u_T$, the magnitude of the velocity command u suddenly increases and the motor velocity suddenly increases just after the switching signal sw is switched from the position control mode to the torque control mode. On the other hand, in the first embodiment of the present invention, because of the setting of the velocity limit value vlim to be smaller than the $|W_x \cdot T_{ref}|$, the torque signal limiter 112 functions to limit the torque-control velocity command $u_T$ output from the regression torque controller 102 to up to the velocity limit value vlim when the control mode is switched to the torque control mode. Therefore, it is possible to prevent the magnitude of the velocity command u from suddenly increasing just after the command generator 200 switches the switching signal sw from the position control mode to the torque control mode.

While the command generator 200 selects the torque control mode as the switching signal sw, the control switching unit 106 outputs the torque-control velocity command $u_T$ to the velocity controller 101 as the velocity command u as expressed by the following Equation (8).

$$u = u_T \quad (8)$$

That is, while the torque control mode is selected, the torque-control velocity command $u_T$ output from the regression torque controller 102 is input to the velocity controller 101. Therefore, the motor velocity v follows the torque-control velocity command $u_T$.

In this case, just before the driving object 201 reaches the point C from the point B, the motor controller 100 operates in the torque control mode but the driving object 201 does not contact the pressure object 202. Accordingly, the motor controller 100 operates in the torque control mode in a state where there is no reaction force from the pressure object 202 for a period from the point B to the point C. Therefore, the motor controller 100 executes an equivalent control to the velocity PI control under which the velocity limit value vlim is the velocity command u because the torque-control velocity command $u_T$ output from the regression torque controller 102 is equal to the velocity limit value vlim before the point C. As a result, the motor velocity v from the point B to the point C smoothly accelerates to be equal to the velocity limit value vlim.

In this way, when operating in the torque control mode, the motor controller 100 generates the velocity command u the magnitude of which is limited up to the velocity limit value vlim. Therefore, even if the position control mode is inadvertently switched to the torque control mode in a state where the driving object 201 does not contact the pressure object 202, it is possible to prevent the motor velocity v from excessively increasing. Furthermore, the motor controller 100 executes the velocity control to make the motor velocity equal to the velocity limit value vlim until the driving object 201 contacts the pressure object 202. Therefore, it is possible to slowly move the driving object 201 stably until the driving object 201 contacts the pressure object 202 without instability, and possible for the driving object 201 to contact the pressure object at a low impact. This can prevent breaking of the driving object 201 and the pressure object 202. An operation for slowly moving the driving object 201 to the position at which the driving object 201 contacts the pressure object 202 is also expressed as "creep operation".

After the creep operation, when the driving object 201 contacts the pressure object 202 at the point C, the reaction force from the pressure object 202 is applied to the motor 203. Accordingly, the motor velocity v decreases, the difference between the velocity command u and the motor velocity v increases, and the output from the velocity controller 101 increases in magnitude, so that magnitudes of the torque command $T_u$ and the regression torque signal $T_t$ increase corresponding to an increase in the reaction force. When the magnitude of the regression torque signal $T_t$ increases, the torque signal deviation $e_T$ that is the difference between the reference torque $T_{ref}$ and the regression torque signal $T_t$ decreases. The absolute value $|W_x \cdot (T_{ref} - T_t)|$ output from the torque signal gain 111 decreases and eventually falls below the velocity limit value vlim. The motor controller 100 drives the driving object 201 by the velocity PI control under which the velocity limit value vlim is the velocity command u, the driving object 201 presses the molding target, and the molding target is molded until the absolute value $|W_x \cdot (T_{ref} - T_t)|$ falls below the velocity limit value vlim.

When the absolute value output from the torque signal gain 111 falls below the velocity limit value vlim, the feedback from the regression torque controller 102 is made effective and the motor controller 100 presses the pressure object 202 so that the regression torque signal $T_t$ equals to the reference torque $T_{ref}$. When the motor controller 100 further presses the pressure object 202, then the reaction force from the pressure object 202 further increases and the torque command $T_u$ or the regression torque signal $T_t$ eventually equals to the reference torque $T_{ref}$. When the regression torque signal $T_t$ equals to the reference torque $T_{ref}$, the torque signal deviation $e_T$ becomes 0 and so does the torque-control velocity command $u_T$. As a result, the velocity command u also becomes 0, and the motor 203 stops at the point at which the reference torque $T_{ref}$ equals to the regression torque signal $T_t$. Because the torque command $T_u$ and the regression torque signal $T_t$ are in a relation where the steady-state values of them equal to each other, the torque command $T_u$ also equals to the reference torque $T_{ref}$. Through the above operation flow, the motor 203 stops at the point at which the torque command $T_u$, the regression torque signal $T_t$, and the reference torque $T_{ref}$ eventually equal to one another.

Figure 5:
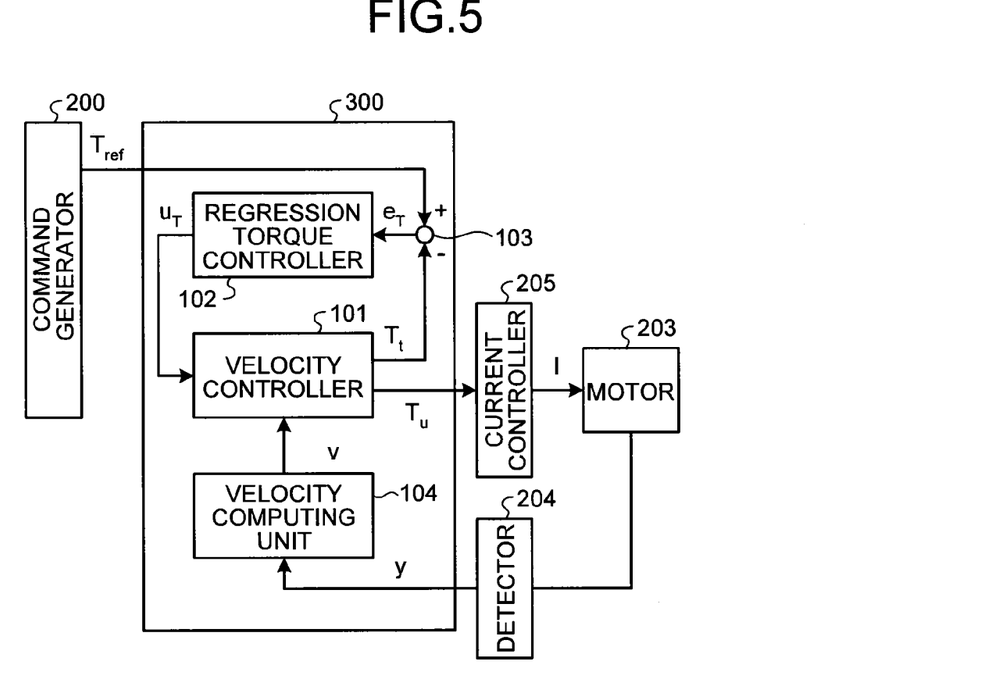
FIG. 5 depicts a configuration of a motor controller that is operated only in a torque control mode.

As described above, the motor controller 100 executes the operation while switching between the position control mode and the torque control mode. Alternatively, a motor controller can be configured, like a motor controller 300 shown in FIG. 5, to exclude the position controller 105 and the control switching unit 106 from the motor controller 100, and can operate only in the torque control mode based on the reference torque $T_{ref}$ from the command generator 200. In that case, the driving object 201 performs the creep operation from the position A to the position C.

As described above, according to the first embodiment of the present invention, the motor controller 100 is configured to include the velocity controller 101 that calculates the torque command $T_u$ to the motor 203 and the regression torque command $T_t$ for compensating for the torque command $T_u$ based on the velocity v of the motor 203, and the regression torque controller 102 that calculates the torque-control velocity command $u_T$ based on the deviation $e_T$ between the reference torque $T_{ref}$ and the regression torque command $T_t$ calculated by the velocity controller 101. The regression torque controller 102 is configured to limit the torque-control velocity command $u_T$ up to the velocity limit value vlim that is determined based on a contact velocity between the driving object 201 and the pressure object 202, and to output the torque-control velocity command $u_T$. The velocity controller 101 is configured to calculate the torque command $T_u$ so that the motor velocity v can follow the torque-control velocity command $u_T$ output from the regression torque controller 102. Therefore, the motor controller 100 can automatically execute the velocity control under which the velocity limit value vlim is the velocity command without causing the motor 203 to generate the reference torque $T_{ref}$ until the driving object 201 contacts the pressure object 202, so that the motor controller 100 can stably control the driving object 201 to approach the pressure object 202 and to contact the pressure object 202 at a low impact. Furthermore, after the driving object 201 contacts the pressure object 202, the motor controller 100 controls the motor 203 to generate the reference torque $T_{ref}$ while feeding back the motor velocity v. Therefore, it is possible to suppress a vibration generated when pressing the pressure object 202. Further, the motor controller 100 controls the driving object 201 to move to the position at which the driving object 201 contacts the pressure object 202 and to contact and then press the pressure object 202 only by inputting the reference torque $T_{ref}$ to the motor controller 100 from the command generator 200. Therefore, the motor controller 100 can perform the operation based on a simple command.

There is a case where the reaction force from the pressure object 202 suddenly decreases due to a failure or the like of the pressure object 202. The sudden decrease in the reaction force from the pressure object 202 causes a sudden decrease in the regression torque signal $T_t$ and an increase in the $W_x \cdot (T_{ref} - T_t)$ output from the torque signal gain 111. Nevertheless, even with the sudden increase in the $W_x \cdot (T_{ref} - T_t)$ output from the torque signal gain 111, it is possible to prevent the motor 203 from suddenly accelerating and the motor velocity v from increasing excessively because the regression torque controller 102 outputs the torque-control velocity command $u_T$ while limiting the torque-control velocity command $u_T$ up to the velocity limit value vlim.

Furthermore, the motor controller 100 is configured to further include the position controller 105 that calculates the position-control velocity command $u_{pv}$ based on the reference command $y_{ref}$ and the detected motor operation value y, and the control switching unit 106 that switches the velocity command to be supplied to the velocity controller 101 between the position-control velocity command $u_{pv}$ calculated by the position controller 105 and the torque-control velocity command $u_T$ output from the regression torque controller 102 based on the switching signal sw. The velocity controller 101 is configured to calculate the torque command $T_u$ so that the motor velocity v can follow the velocity command u selected by the control switching unit 106. Therefore, the command generator 200 can instruct the motor controller 100 to execute the position control using the reference command $y_{ref}$ before the driving object 201 contacts the pressure object 202. Further, the regression torque controller 102 outputs the torque-control velocity command $u_T$ while limiting the torque-control velocity command $u_T$ up to the velocity limit value vlim. Therefore, it is possible to prevent the sudden increase in the motor velocity v at a moment when the command generator 200 operates the switching signal sw and switches the modes. Furthermore, the command generator 200 generates the reference command $y_{ref}$ to move the driving object 201 to an arbitrary position before the driving object 201 contacts the pressure object 202 and to then stop the driving object 201, and can change the motor controller 100 into the torque control mode only by operating the switching signal sw. This enables the motor controller 200 to operate based on a simple command.

In the first embodiment, the Equations (6) express that the torque signal limiter 112 always gives the limitations equal in magnitude to both a plus direction (a motor normal rotation direction) and a minus direction (a motor inverse rotation direction). Alternatively, in the first embodiment, the torque signal limiter 112 can be configured to make the velocity limit value vlim variable or to make the velocity limit value vlim changeable online from a higher controller. In addition, the torque signal limiter 112 can limit the magnitude only in one of the normal rotation direction and the inverse rotation direction of the motor 203.

In the first embodiment, the position controller 105 has a characteristic of the position P control, and the velocity controller 101 has a characteristic of the velocity PI control. The characteristics of the position controller 105 and the velocity controller 101 are not limited to these characteristics. As long as the position controller 105 executes a control so that the motor 203 does not operate unstably and so that the detected motor operation value y can follow the reference command $y_{ref}$, the position controller 105 does not necessarily have the characteristic of the position P control. In addition, as long as the motor velocity v follows the velocity command u, the velocity controller 101 does not necessarily have the characteristic of the velocity PI control.

The torque command $T_u$ and the regression torque signal $T_t$ do not necessarily have the relation as expressed by the Equation (5) but can equal to each other.

Second Embodiment

In the first embodiment, the motor controller switches operation modes between the position control mode and the torque control mode. On the other hand, in a second embodiment, a motor controller switches the operation modes between a velocity control mode and the torque control mode.

Figure 6:
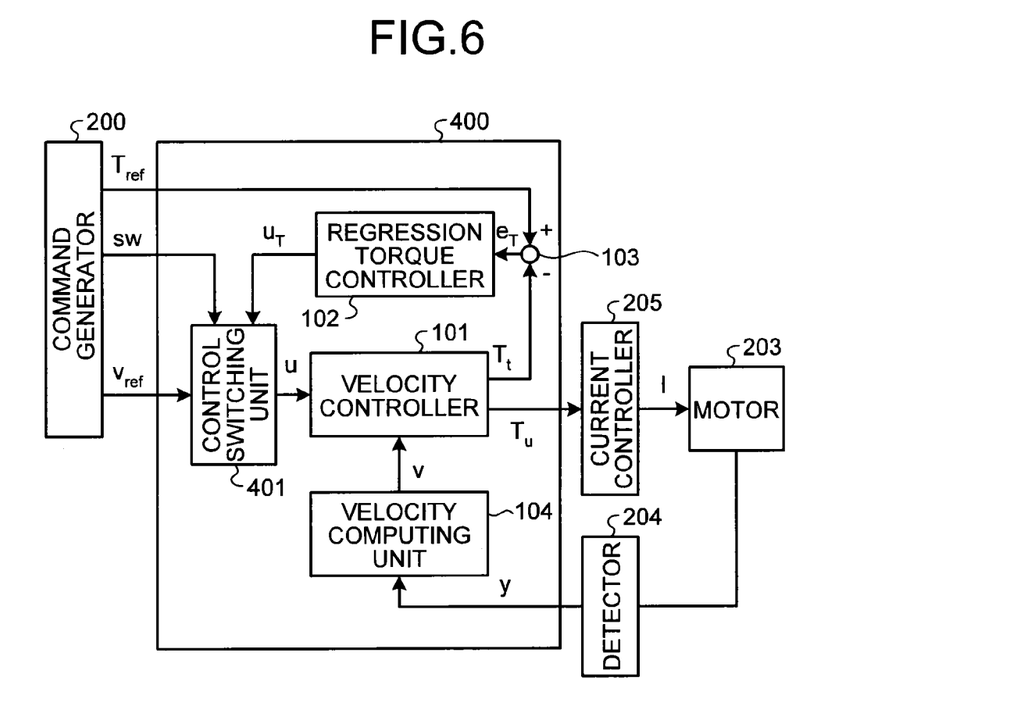
FIG. 6 depicts a configuration of a motor controller according to a second embodiment.

FIG. 6 depicts a configuration of a motor controller according to the second embodiment of the present invention. In the present embodiment, constituent elements that perform inputting and outputting that are identical to those in the first embodiment are denoted by like reference signs and redundant explanations thereof will be omitted.

As shown in FIG. 6, an external reference velocity $v_{ref}$ that is a target value for the motor velocity v, the switching signal sw for switching between the velocity control mode and the torque control mode, and the reference torque $T_{ref}$ in the velocity control mode are input to a motor controller 400 according to the second embodiment from the command generator 200. Furthermore, the motor operation value y detected by the detector 204 is input to the motor controller 400. The motor controller 400 operates in the operation mode commanded by the switching signal sw, and generates the torque command $T_u$ to be supplied to the current controller 205.

The motor controller 400 includes the velocity controller 101, the regression torque controller 102, the torque signal subtracter 103, the velocity computing unit 104, and a control switching unit 401. The control switching unit 401 outputs the external reference velocity value $V_{ref}$ to the velocity controller 101 as the velocity command u when the command generator 200 selects the velocity control mode as the switching signal sw, and outputs the torque-control velocity command $u_T$ generated by the regression torque controller 102 to the velocity controller 101 as the velocity command u when the command generator 200 selects the torque control mode as the switching signal sw.

The motor controller 400 according to the second embodiment operates similarly to the motor controller 100 according to the first embodiment except that the motor controller 400 operates not in the position control mode but in the velocity control mode from the point A to the point B, and thus redundant explanations will be omitted.

In this way, according to the second embodiment of the present invention, the motor controller 400 is configured to further include the control switching unit 401 that switches the velocity command u to be supplied to the velocity controller 101 between the external reference velocity value $V_{ref}$ and the torque-control velocity command $u_T$ output from the regression torque controller 102 based on the switching signal sw. The velocity controller 101 is configured to calculate the torque command $T_u$ so that the motor velocity v can follow the velocity command u selected by the control switching unit 401. Therefore, the command generator 200 can instruct the motor controller 400 to execute the velocity control using the external reference velocity value $V_{ref}$ before the driving object 201 contacts the pressure object 202. Furthermore, the regression torque controller 102 outputs the torque-control velocity command $u_T$ while limiting the torque-control velocity command $u_T$ up to the velocity limit value vlim. Therefore, it is possible to prevent the sudden increase in the motor velocity v at the moment when the command generator 200 operates the switching signal sw to switch the modes. Furthermore, the command generator 200 generates the external reference velocity $v_{ref}$ to move the driving object 201 to the appropriate position before the driving object 201 contacts the pressure object 202 and to then stop the driving object 201, and can change the motor controller 400 into the torque control mode only by operating the switching signal sw. This enables the motor controller 400 to operate based on a simple command.

In the second embodiment, while the detector 204 detects the detected motor operation value and the velocity computing unit 104 computes the motor velocity v based on the detected motor operation value y, such a detector as a resolver can be used to directly detect the motor velocity v.

Third Embodiment

Figure 7:
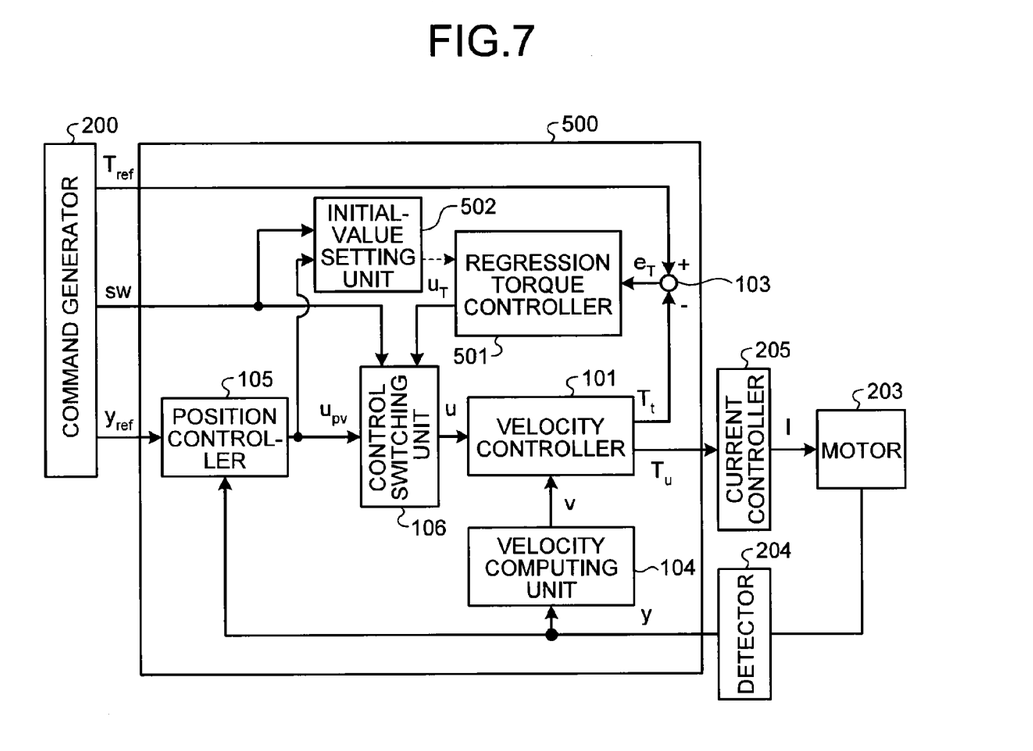
FIG. 7 depicts a configuration of a motor controller according to a third embodiment.

A motor controller according to a third embodiment executes a control while switching between the position control mode and the torque control mode. FIG. 7 depicts a configuration of the motor controller according to the third embodiment of the present invention. In FIG. 7, constituent elements that perform inputting and outputting that are identical to those in the first embodiment are denoted by like reference signs and redundant explanations thereof will be omitted.

As shown in FIG. 7, the reference command $y_{ref}$, the switching signal sw for switching between the position control mode and the torque control mode, and the reference torque $T_{ref}$ are input to a motor controller 500 from the command generator 200. Furthermore, the detected motor operation value y is input to the motor controller 500 from the detector 204. The motor controller 500 operates in the operation mode commanded by the switching signal sw, and generates the torque command $T_u$ to be supplied to the current controller 205.

The motor controller 500 includes the velocity controller 101, a regression torque controller 501, the torque signal subtracter 103, the velocity computing unit 104, the position controller 105, the control switching unit 106, and an initial-value setting unit 502.

Figure 8:
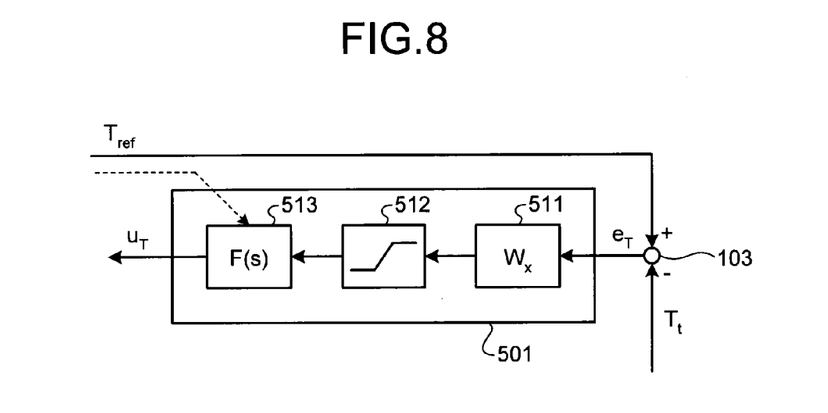
FIG. 8 depicts a configuration of a regression torque controller according to the third embodiment.

The regression torque controller 501 calculates the torque-control velocity command $u_T$ to be input to the control switching unit 106 based on the torque signal deviation $e_T$ from the torque signal subtracter 103. FIG. 8 depicts a configuration of the regression torque controller 501.

As shown in FIG. 8, the regression torque controller 501 includes a torque signal gain 511, a torque signal limiter 512, and a filter 513. The torque signal gain 511 multiplies the torque signal deviation $e_T$ by the constant ($W_x$) and outputs the result of multiplication to the torque signal limiter 512. The torque signal limiter 512 limits the magnitude (an absolute value) of the output from the torque signal gain 511 to be equal to or smaller than the predetermined magnitude and outputs the result of the limitation by a similar computation to that expressed by the Equations (6).

An output from the torque signal limiter 512 is input to the filter 513, and the filter 513 outputs the torque-control velocity command $u_T$ by a computation expressed by a transfer function F(s). A computation using state variables as represented by an integrator in a continuous time system or shift registers in a discrete time system realizes the computation expressed by the transfer function F(s). By performing a process for rewriting these state variables at a desired timing, a result of the computation expressed by the transfer function F(s) can be changed discontinuously. Note that a steady-state gain |F(0)| of the filter 513 is set to 1.

The torque-control velocity command $u_T$ that is the result of the computation executed by the regression torque controller 501 is expressed by the following Equations (9).

$$u_T = F(s) \cdot W_x \cdot e_T \text{ if } |W_x \cdot e_T| < \text{vlim}$$

$$u_T = F(s) \cdot \text{vlim if } |W_x \cdot e_T| \text{vlim} \qquad (9)$$

The position-control velocity command and the switching signal sw are input to the initial-value setting unit 502. The initial-value setting unit 502 sets the state variables of the filter 513 described above, so that the torque-control velocity command $u_T$ output from the filter 513 equals to the position-control velocity command $u_{pv}$ at a timing at which the switching signal sw is switched from the position control mode to the torque control mode.

Next, characteristics of the motor controller 500 in a case where the torque control mode is selected as the switching signal sw and where a condition of $|W_x \cdot e_T| < \text{vlim}$ is satisfied is described. For simplicity, the characteristics of the motor controller 500 is described on the assumption that the control of the velocity controller 101 is the velocity PI control expressed by the Equations (2) and (3) and that the filter 513 has characteristics of a primary lowpass filter a cutoff frequency of which equals to a velocity integral gain $K_i$ as expressed by the following Equation (10).

$$F(s) = K_i/(s+K_i) \qquad (10)$$

By using the Equations (2), (3), (5), (9), and (10), a transfer function from the reference torque $T_{ref}$ to the torque command $T_u$ and that from the motor velocity v to the torque command $T_u$ in the case of satisfying $|W_x \cdot e_T| < \text{vlim}$ are expressed by the following equations (11) and (12), respectively.

$$T_u/T_{ref} = H(s) \cdot K_v \cdot K_i \cdot W_x/(s+K_v \cdot K_i \cdot W_x) \qquad (11)$$

$$T_u/v = H(s) \cdot K_v \cdot (s+K_i)/(s+K_v \cdot K_i \cdot W_x) \qquad (12)$$

In this case, when the torque signal gain $W_x$ is assumed as 0, the transfer function expressed by the Equation (11) is 0.

Furthermore, the transfer function expressed by the Equation (12) is equal to the PI control over the motor velocity v. That is, the characteristics of the motor controller 500 are those of the velocity PI control with the velocity command u set to 0.

When the torque signal gain $W_x$ increases up to a substantial infinity (a maximum value limited by a control cycle) and the filter H(s) is 1, the transfer function expressed by the Equation (11) is substantially 1 and that expressed by the Equation (12) is 0. That is, this makes torque command $T_u$ equal to the reference torque $T_{ref}$ and the characteristics of the motor controller 500 are substantially for executing a torque feed-forward control. Such characteristics of the torque control mode are suited to a purpose of, for example, pressing the pressure object 202 high in viscosity and difficult to vibrate at a desired pressure.

When the torque signal gain $W_x$ is set to an intermediate value between the two examples described above, according to the Equations (11) and (12), the characteristics of the motor controller 500 are characteristics of the velocity control to make the torque command $T_u$ equal to the reference torque $T_{ref}$ at a frequency lower than the torque signal gain $W_x$, and to make the velocity of the motor 203 closer to 0 at a frequency higher than the torque signal gain $W_x$. By providing the motor controller 500 with these characteristics, the motor controller 500 can stably control the driving object 201 to steadily press the driving object 201 against the pressure object 202 at a pressure corresponding to the reference torque $T_{ref}$ while suppressing a vibration when the vibration tends to occur when pressing the driving object 201 against the pressure object 202.

Figure 9:
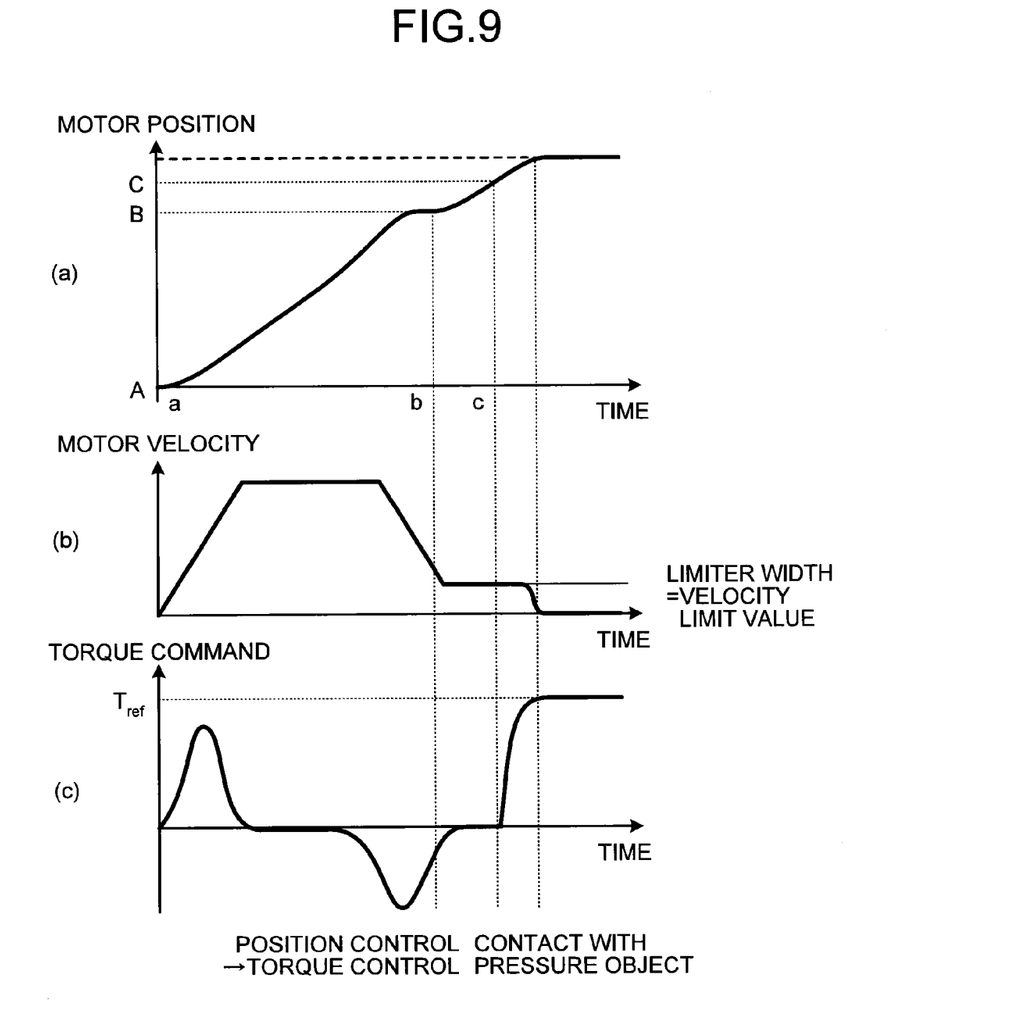
FIG. 9 depicts graphs for explaining an operation performed by the motor controller according to the third embodiment.

An operation performed by the motor controller 500 is explained next. FIG. 9 depicts graphs for explaining an operation performed by the motor controller 500. FIGS. 9(a), 9(b), and 9(c) depict a transition of the detected motor operation value y, a transition of the motor velocity v, and a transition of the torque command $T_u$, respectively. It is assumed here that the motor controller 500 switches the modes without stopping the motor at the position B differently from the first embodiment. Operations in the position control mode are identical to those described in the first embodiment, and thus explanations thereof will be omitted. The motor controller 500 operates in the position control mode to control the driving object 201 to move to the position B.

An operation performed when the motor controller 500 switches the modes at the position B is explained next. First, at the point B, the command generator 200 switches the switching signal sw from the position control mode to the torque control mode. When the command generator 200 switches the switching signal sw from the position control mode to the torque control mode, the initial-value setting unit 502 sets the state variables of the filter 513 included in the regression torque controller 501 so that the torque-control velocity command $u_T$ equals to the position-control velocity command $u_{pv}$. At the same time, the control switching unit 106 selects the torque-control velocity command $u_T$ as the velocity command u. As a result, the regression torque signal $T_t$ and the torque command $T_u$ can be kept continuous before and after the switching timing. In other words, even if the position control mode is switched to the torque control mode while the motor 203 operates, it is possible to prevent an abrupt change in the velocity at a moment when the control mode is switched.

An operation after the position control mode is switched to the torque control mode is explained next. In an example of FIG. 9, the position control mode changes to the torque control mode at and after the point B (at and after the time b). Until the driving object 201 reaches the position C from the position B (that is, until the driving object 201 contacts the pressure object 202 since the position control mode is switched to the torque control mode), the motor controller 500 operates in the torque control mode in the state of no reaction force from the pressure object 202. Furthermore, the output from the torque signal limiter 512 equals to that from the filter 513 in a steady state because the steady-state gain |F(0)| of the filter 513 is set to 1. That is, the velocity controller 101 controls the motor velocity v to follow the torque-control velocity command $u_T$ output from the regression torque controller 501. The motor velocity v smoothly changes to the same velocity as the velocity limit value vlim irrespectively of the motor velocity v at the timing at which the position control mode is switched to the torque control mode. Therefore, similarly to the first embodiment, the motor controller 500 can control the driving object 201 to slowly and stably approach the pressure object 202 and to contact the pressure object 202 at a low impact.

When the driving object 201 contacts the pressure object 202 at the point C, the reaction force from the pressure object 202 is applied to the motor 203. The motor velocity v decreases, the difference between the velocity command u and the motor velocity v increases, and the output from the velocity controller 101 increases in magnitude, so that the magnitudes of the torque command $T_u$ and the regression torque signal $T_t$ increase corresponding to the reaction force. When the magnitude of the regression torque signal $T_t$ increases, the torque signal deviation $e_T$ that is the difference between the reference torque $T_{ref}$ and the regression torque signal $T_t$ decreases. The absolute value $|W_x \cdot (T_{ref} - T_t)|$ output from the torque signal gain 511 decreases and eventually falls below the velocity limit value vlim. Before this moment, the velocity controller 101 controls the driving object 201 to move slowly and to pressure the pressure object 202. When the absolute value output from the torque signal gain 511 falls below the velocity limit value vlim, the feedback from the regression torque controller 501 is made effective and the motor controller 500 presses the pressure object 202 so that the regression torque signal $T_t$ equals to the reference torque $T_{ref}$. When the motor controller 500 further presses the pressure object 202, then the reaction force from the pressure object 202 further increases and the torque command $T_u$ or the regression torque signal $T_t$ equals to the reference torque $T_{ref}$. When the regression torque signal $T_t$ equals to the reference torque $T_{ref}$, the torque signal deviation $e_T$ becomes 0 and so does the torque-control velocity command $u_T$. As a result, the velocity command u also becomes 0, and the motor 203 stops at the point at which the reference torque $T_{ref}$ equals to the regression torque signal $T_t$. Because the torque command $T_u$ equals to the steady-state value of the regression torque signal $T_t$, the torque command $T_u$ equals to the reference torque $T_{ref}$. Through the above operation flow, the motor 203 stands still at the point at which torque command $T_u$, the regression torque signal $T_t$, and the reference torque $T_{ref}$ eventually equal to one another.

In this way, according to the third embodiment of the present invention, the regression torque controller 501 is configured to include the filter 513 that executes the computation using the state variables. The motor controller 500 is configured to further include the initial-value setting unit 502 that sets the state variables to the filter 513 so that the position-control velocity command $u_{pv}$ just before the switching equals to the torque-control velocity command $u_T$ just after the switching when the control switching unit 106 switches the velocity command u from the position-control velocity command $u_{pv}$ to the torque-control velocity command $u_T$. This can make the torque command $T_u$ continuous during the switching. That is, in addition to the effects of the first and second embodiments, the torque continuity can be kept during the switching even when the command generator 200 operates the switching signal sw to switch the modes in a state where the motor 203 does not stop.

When the control of the velocity controller 101 is the velocity PI control expressed by the Equations (2) and (3) and the filter 513 has the characteristics of the primary lowpass filter the cutoff frequency of which equals to the velocity integral gain $K_i$ as expressed by the Equation (10), it is possible to provide the motor controller 500 with the same characteristics as those of the feed-forward torque control by setting the torque signal gain $W_x$ to the substantial infinity (a maximum value limited by the control cycle). Furthermore, by adjusting the torque signal gain $W_x$, transient characteristics can be adjusted to desired characteristics.

While it has been described in the third embodiment that the motor controller 500 operates while switching between the position control mode and the torque control mode, the motor controller 500 can operate while switching between the velocity control mode and the torque control mode as described in the second embodiment.

It has been described above that the filter 513 of the regression torque controller 501 is the lowpass filter and that the velocity control of the velocity controller 101 is the PI control. However, the characteristics of the filter 513 of the regression torque controller 501 and the characteristics of the velocity control of the velocity controller 101 are not limited to the above characteristics.

Fourth Embodiment

A motor controller according to a fourth embodiment of the present invention is explained with reference to FIGS. 10 to 12. The motor controller according to the fourth embodiment operates while switching between a position control mode and a torque control mode.

Figure 10:
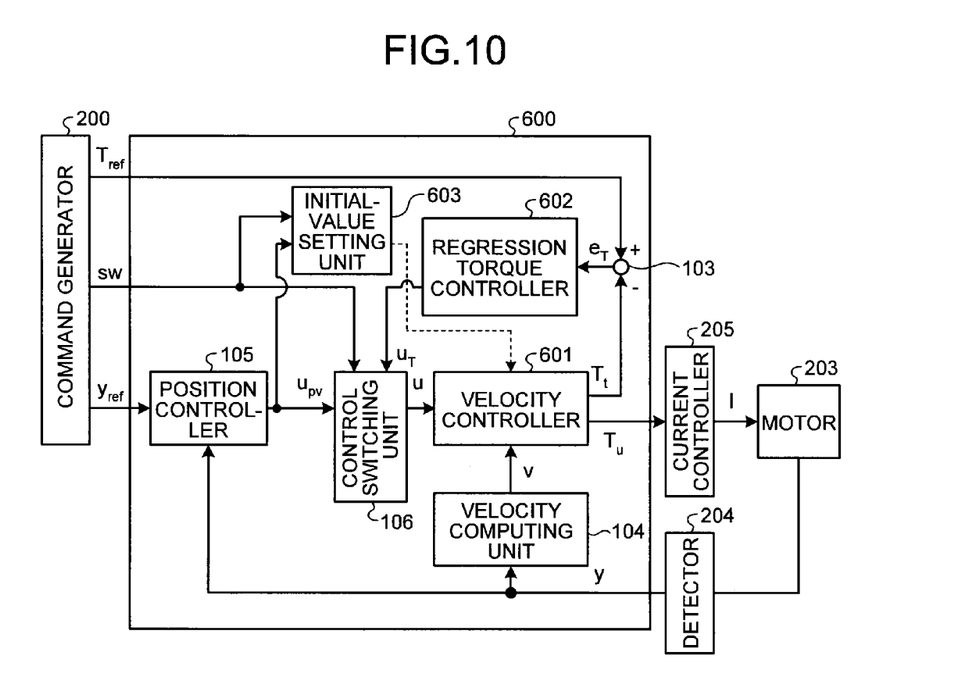
FIG. 10 depicts a configuration of a motor controller according to a fourth embodiment.

FIG. 10 depicts a configuration of the motor controller according to the fourth embodiment. As shown in FIG. 10, the reference command $y_{ref}$, the switching signal sw, and the reference torque $T_{ref}$ are input to a motor controller 600 from the command generator 200. Furthermore, the detected motor operation value y is input to the motor controller 600 from the detector 204. The motor controller 600 operates in an operation mode commanded by the switching signal sw, and generates the torque command $T_u$ to be supplied to the current controller 205.

The motor controller 600 includes a velocity controller 601, a regression torque controller 602, the torque signal subtracter 103, the velocity computing unit 104, the position controller 105, the control switching unit 106, and an initial-value setting unit 603.

The regression torque controller 602 calculates the torque-control velocity command $u_T$ to be input to the control switching unit 106 based on the torque signal deviation $e_T$ from the torque signal subtracter 103. FIG. 11 depicts a configuration of the regression torque controller 602.

Figure 11:
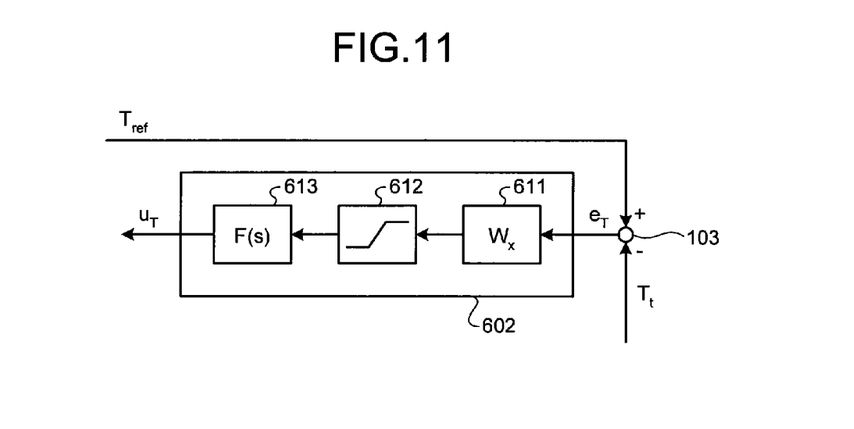
FIG. 11 depicts a configuration of a regression torque controller according to the fourth embodiment.

As shown in FIG. 11, the regression torque controller 602 includes a torque signal gain 611, a torque signal limiter 612, and a filter 613. The torque signal gain 611 multiplies the torque signal deviation $e_T$ by the constant ($W_x$) and outputs the result of multiplication to the torque signal limiter 612. The torque signal limiter 612 limits the magnitude (an absolute value) of the output from the torque signal gain 611 to be equal to or smaller than the predetermined magnitude and outputs the result of the limitation by a similar computation to that expressed by the Equations (6). The filter 613 includes at least one integrator, and computes and outputs the torque-control velocity command $u_T$ based on the output from the torque signal limiter 612. Furthermore, differently from the third embodiment, it is assumed that an initial value of each of all the integrators included in the filter 613 is 0. With this configuration, the value of the torque-control velocity command $u_T$ at the moment when the switching signal sw is switched to the torque control mode is 0. Characteristics of the filter 613 are expressed as F(s). The torque-control velocity command $u_T$ is equivalent to that expressed by the Equations (9). A steady-state gain |F(0)| of the filter 613 is set to 1.

The velocity controller 601 includes at least one integrator that executes an integral compensation computation so as to reduce the deviation between the velocity command u and the motor velocity v, acquires the velocity command u from the control switching unit 106 and the motor velocity v from the velocity computing unit 104, calculates the torque command $T_u$ so that the motor velocity v equals to the velocity command u, and outputs the calculated torque command $T_u$ to the current controller 205. Furthermore, the velocity controller 601 outputs the regression torque signal $T_t$ the steady-state value of which equals to the torque command $T_u$ to the torque signal subtracter 103. For example, the velocity controller 601 that includes the integrators is a PI controller shown in FIG. 12.

Figure 12:
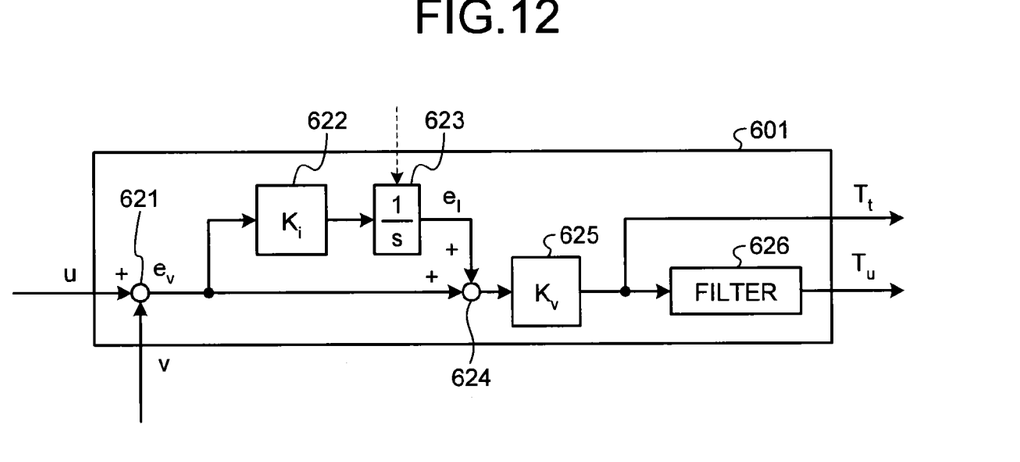
FIG. 12 depicts a configuration example of a velocity controller according to the fourth embodiment.

As shown in FIG. 12, the velocity controller 601 includes a velocity signal subtracter 621, a velocity integral gain 622, a velocity integrator 623, a velocity input adder 624, a velocity proportional gain 625, and a filter 626. The velocity command u and the motor velocity v are input to the velocity signal subtracter 621, and the velocity signal subtracter 621 computes the difference between the input velocity command u and the input motor velocity v and outputs a result of the computation as a velocity deviation $e_v$. The velocity deviation $e_v$ is input to the velocity integral gain 622, and the velocity integral gain 622 multiplies the input velocity deviation $e_v$ by a constant ($K_i$) and outputs a result of multiplication. An output from the velocity integral gain 622 is input to the velocity integrator 623, and the velocity integrator 623 integrates the input value and outputs an integral value as a velocity integral output $e_I$.

The velocity input adder 624 calculates a sum between the velocity integral output $e_I$ and the velocity deviation $e_v$, and outputs the sum to the velocity proportional gain 625. An output from the velocity input adder 624 is input to the velocity proportional gain 625, and the velocity proportional gain 625 multiplies the input value by a constant ($K_v$) and outputs a result of multiplication as the regression torque signal $T_t$. The regression torque signal $T_t$ is input to the filter 626, and the filter 626 reduces signals of predetermined frequency components from the regression torque signal $T_t$ and outputs a result of reduction as the torque command $T_u$.

The velocity controller 601 shown in FIG. 12 calculates the regression torque signal $T_t$ by executing the computation as expressed by the Equation (3), and computes the torque command $T_u$ from the regression torque signal $T_t$ as expressed by the Equation (4).

The switching signal sw and the position-control velocity command $u_{pv}$ are input to the initial-value setting unit 603. The initial-value setting unit 603 changes a value of the velocity integrator 623 included in the velocity controller 601 so as to ensure the torque continuity before and after the switching at the timing at which the command generator 200 switches the switching signal sw from the position control mode to the torque control mode.

Operations and characteristics according to the present embodiment are explained next. Operations and characteristics in the position control mode according to the fourth embodiment are equivalent to those according to the first and third embodiments, and thus explanations thereof will be omitted. In addition, operations and characteristics in the torque control mode according to the fourth embodiment are equivalent to those according to the third embodiment, and thus explanations thereof will be omitted. Operations during the switching of the modes are explained below.

When the command generator 200 switches the switching signal sw from the position control mode to the torque control mode, the initial-value setting unit 603 adds the position-control velocity command $u_{pv}$ at the timing of the switching to the value of the velocity integrator 623 included in the velocity controller 601. Furthermore, the control switching unit 106 switches the velocity command u from the position-control velocity command $u_{pv}$ to the torque-control velocity command $u_T$.

The output from the velocity input adder 624 is $e_I+u_{pv}-v$ because the position-control velocity command $u_{pv}$ is output as the velocity command u just before the switching signal sw is switched from the position control mode to the torque control mode. On the other hand, the velocity command u is 0 and the output from the velocity input adder 624 is $e_I-v$ because the initial value of the torque-control velocity command $u_T$ is 0 just after the position control mode is switched to the torque control mode. Therefore, when the position control mode is switched to the torque control mode, the position-control velocity command is added to a present value of the velocity integrator 623 and a value of the velocity integral output $e_I$ is increased by as much as the position-control velocity command $u_{pv}$. This can keep the output from the velocity input adder 624 continuous. As a result, the regression torque signal $T_t$ and the torque command $T_u$ can be kept continuous before and after the switching from the position control mode to the torque control mode. In other words, even when the position control mode is switched to the torque control mode while the motor operates, it is possible to prevent the abrupt change in the velocity at the moment when the control mode is switched.

As described above, according to the fourth embodiment, the velocity controller 601 is configured to include the velocity integrator 623 that executes the integral compensation computation so as to reduce the deviation between the velocity command u selected by the control switching unit 106 and the motor velocity v, and the motor controller 600 is configured to further include the initial-value setting unit 603 that corrects the output from the velocity integrator 623 so that the output from the velocity integrator 623 just before the switching is equal to that from the velocity integrator 623 just after the switching when the control switching unit 106 switches the velocity command u from the position-control velocity command $u_{pv}$ to the torque-control velocity command $u_T$. Similarly to the third embodiment, the torque continuity can be kept during the switching even if the command generator 200 operates the switching signal sw to switch the modes in a state where the motor 203 does not stand still.

While it has been described in the fourth embodiment that the motor controller 600 operates while switching between the position control mode and the torque control mode, the motor controller 600 can operate while switching between the velocity control mode and the torque control mode as described in the second embodiment.

In the fourth embodiment, the regression torque signal $T_t$ and the torque command $T_u$ just after the switching can be calculated in advance by setting the value of the torque-control velocity command $u_T$ just after the switching from the position control mode to the torque control mode to 0, and the value of the velocity integrator 623 included in the velocity controller 601 is updated based on the calculation. Alternatively, it is possible to achieve the same effects as those of the fourth embodiment even when the value of the integrator of the filter 626 included in the regression torque controller 602 is set so that the torque-control velocity command $u_T$ can be set to an appropriate value. The value of the velocity integrator 623 included in the velocity controller 601 is updated based on the difference between the regression torque signal $T_t$ before the switching from the position control mode to the torque control mode and the regression torque signal $T_t$ just after the switching, or the difference between the torque command $T_u$ before the switching and the torque command $T_u$ just after the switching.

Furthermore, in the fourth embodiment, the velocity controller 601 is the PI controller. However, the velocity controller 601 is not necessarily limited to the PI controller, and any control method can be used as long as the velocity controller 601 includes the integrator that executes the integral compensation computation so as to reduce the deviation between the velocity command and the motor velocity and the detected motor operation value y can follow the reference command $y_{ref}$ and the motor velocity v can follow the velocity command u without making the motor 203 unstable.

INDUSTRIAL APPLICABILITY

As described above, the motor controller according to the present invention is preferable to be applied to a motor controller that drives a motor included in an industrial machine.

REFERENCE SIGNS LIST

100 MOTOR CONTROLLER
101 VELOCITY CONTROLLER
102 REGRESSION TORQUE CONTROLLER
103 TORQUE SIGNAL SUBTRACTER
104 VELOCITY COMPUTING UNIT
105 POSITION CONTROLLER
106 CONTROL SWITCHING UNIT
111 TORQUE SIGNAL GAIN
112 TORQUE SIGNAL LIMITER
200 COMMAND GENERATOR
201 DRIVING OBJECT
202 PRESSURE OBJECT
203 MOTOR
204 DETECTOR
205 CURRENT CONTROLLER
400 MOTOR CONTROLLER
401 CONTROL SWITCHING UNIT
500 MOTOR CONTROLLER
501 REGRESSION TORQUE CONTROLLER
502 INITIAL-VALUE SETTING UNIT
511 TORQUE SIGNAL GAIN
512 TORQUE SIGNAL LIMITER
513 FILTER
600 MOTOR CONTROLLER
601 VELOCITY CONTROLLER
602 REGRESSION TORQUE CONTROLLER
603 INITIAL-VALUE SETTING UNIT
611 TORQUE SIGNAL GAIN
612 TORQUE SIGNAL LIMITER
613 FILTER
621 VELOCITY SIGNAL SUBTRACTER
622 VELOCITY INTEGRAL GAIN
623 VELOCITY INTEGRATOR
624 VELOCITY INPUT ADDER

625 VELOCITY PROPORTIONAL GAIN
626 FILTER

The invention claimed is:

1. A motor controller for controlling a motor that drives a driving object to press the driving object against a pressure object at a pressure corresponding to a reference torque, the motor controller comprising:
   a velocity controller that calculates a torque command to the motor and a regression torque for compensating for the torque command based on a detected velocity value of the motor; and
   a regression torque controller that calculates a first velocity command corresponding to a deviation between the reference torque and the regression torque calculated by the velocity controller, wherein
   the regression torque controller limits the calculated first velocity command up to a desired velocity limit value that is defined based on a contact velocity between the driving object and the pressure object, and outputs the first velocity command, and
   the velocity controller calculates the torque command so that the detected velocity value follows the first velocity command output from the regression torque controller.

2. The motor controller according to claim 1, further comprising:
   a position controller that calculates a second velocity command based on a position command input from outside and a position detection value of the motor; and
   a control switching unit that switches a velocity command to be supplied to the velocity controller between the second velocity command calculated by the position controller and the first velocity command output from the regression torque controller based on a switching signal input from outside, wherein
   the velocity controller calculates the torque command so that the detected velocity value follows the velocity command supplied from the control switching unit.

3. The motor controller according to claim 1, further comprising a control switching unit that switches a velocity command to be supplied to the velocity controller between a second velocity command input from outside and the first velocity command output from the regression torque controller based on a switching signal input from outside, wherein
   the velocity controller calculates the torque command so that the detected velocity value follows the velocity command supplied from the control switching unit.

4. The motor controller according to claim 2, wherein
   the regression torque controller includes a filter that executes a computation using state variables, and
   the motor controller further comprises an initial-value setting unit that sets the state variables to the filter so that the second velocity command just before switching equals to the first velocity command just after the switching when the control switching unit switches the velocity command to be supplied to the velocity controller from the second velocity command to the first velocity command.

5. The motor controller according to claim 2, wherein
   the velocity controller includes an integrator that executes an integral compensation computation so as to reduce a deviation between the velocity command selected by the control switching unit and the detected velocity value, and
   the motor controller further comprises an integral correction unit that corrects an output from the integrator so that the torque command output just before switching is equal to the torque command output just after the switching when the control switching unit switches the velocity command to be supplied to the velocity controller from the second velocity command to the first velocity command.

6. The motor controller according to claim 5, wherein
   the regression torque controller includes a filter that executes a computation using state variables, and
   the motor controller further comprises an initial-value setting unit that sets the state variables to the filter so that the second velocity command just before switching equals to the first velocity command just after the switching when the control switching unit switches the velocity command to be supplied to the velocity controller from the second velocity command to the first velocity command.

7. The motor controller according to claim 5, wherein
   the velocity controller includes an integrator that executes an integral compensation computation so as to reduce a deviation between the velocity command selected by the control switching unit and the detected velocity value, and
   the motor controller further comprises an integral correction unit that corrects an output from the integrator so that the torque command output just before switching is equal to the torque command output just after the switching when the control switching unit switches the velocity command to be supplied to the velocity controller from the second velocity command to the first velocity command.

* * * * *